US008571562B2

(12) United States Patent
Narang et al.

(10) Patent No.: US 8,571,562 B2
(45) Date of Patent: Oct. 29, 2013

(54) METHOD AND APPARATUS FOR CELL CHANGE ORDER

(75) Inventors: Mohit Narang, Escondido, CA (US); Mukesh Mittal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 907 days.

(21) Appl. No.: 12/024,299

(22) Filed: Feb. 1, 2008

(65) Prior Publication Data

US 2008/0194287 A1 Aug. 14, 2008

Related U.S. Application Data

(60) Provisional application No. 60/889,248, filed on Feb. 9, 2007.

(51) Int. Cl.
*H04W 36/00* (2009.01)

(52) U.S. Cl.
USPC ...... 455/439; 455/432.1; 455/436; 455/452.1

(58) Field of Classification Search
USPC ........... 455/414.1, 432.3, 433, 434, 435.1, 455/435.2, 436, 437, 438, 439, 452.2, 453, 455/552.1, 525; 370/329, 331, 332
See application file for complete search history.

(56) References Cited

U.S. PATENT DOCUMENTS

| | | | |
|---|---|---|---|
| 6,259,917 B1 * | 7/2001 | Elzein | 455/435.2 |
| 6,463,054 B1 * | 10/2002 | Mazur et al. | 370/352 |
| 6,925,095 B2 | 8/2005 | Pecen et al. | |
| 7,085,570 B2 * | 8/2006 | Tigerstedt et al. | 455/439 |
| 7,203,512 B2 * | 4/2007 | Jeong et al. | 455/522 |
| 2004/0242199 A1 * | 12/2004 | Edlund et al. | 455/411 |
| 2005/0107109 A1 * | 5/2005 | Gunaratnam et al. | 455/525 |
| 2005/0266845 A1 * | 12/2005 | Aerrabotu et al. | 455/436 |
| 2006/0258386 A1 * | 11/2006 | Jeong et al. | 455/525 |
| 2008/0037494 A1 * | 2/2008 | Hietalahti et al. | 370/338 |
| 2008/0043679 A1 * | 2/2008 | Karlsson et al. | 370/335 |
| 2008/0137612 A1 * | 6/2008 | Gallagher et al. | 370/331 |
| 2008/0194257 A1 * | 8/2008 | Zhang et al. | 455/434 |
| 2009/0061877 A1 * | 3/2009 | Gallagher et al. | 455/436 |
| 2010/0099454 A1 * | 4/2010 | Reddy | 455/552.1 |
| 2011/0228704 A1 * | 9/2011 | Oerton | 370/254 |

OTHER PUBLICATIONS

International Search Report, PCT/US08/053348, International Search Authority, European Patent Office, Jul. 22, 2008.
Written Opinion, PCT/US08/053348, International Search Authority, European Patent Office, Jul. 22, 2008.
Muhammad, "Roaming from one G to another," IEE Communication Engineer, Apr./May 2004, pp. 40-43, XP002487446.
Lugara et al., "UMTS to GSM handover based on compressed mode technique," 2004 IEEE International Conference on Communications, Paris, France, Jun. 20-24, 2004, pp. 3051-3055, vol. 5, IEEE, Piscataway, NJ, USA, XP010709763.

(Continued)

*Primary Examiner* — Jean Gelin
(74) *Attorney, Agent, or Firm* — Abdollah Katbab

(57) ABSTRACT

A method and apparatus for cell change order including issuing or receiving a cell change order message to find a target cell in a network with no compressed mode measurement, performing a power scan on the network to find a suitable cell if the target cell is not found, and camping on the suitable cell if found. In one aspect, the network is a 2G network. In yet another aspect, the network is a GSM network.

43 Claims, 4 Drawing Sheets

(56) References Cited

OTHER PUBLICATIONS

Alsenmyr et al., "Handover between WCDMA and GSM," Ericsson Review No. 1, 2003, pp. 6-11, XP002487447.

Taiwan Search Report—TW097104966—TIPO—Aug. 3, 2011.
Tung-Wen Huang, "Training report for 3G network radio resource management technology teacher training," http://210.241.21.163/OpenFront/report/show_file.jsp?sysId=C09305546&fileNo=001 Dec. 16, 2004 Sections 1.2, 1.3, 2.4, 2.6; Fig. 2.

* cited by examiner

METHOD AND APPARATUS FOR CELL CHANGE ORDER

CLAIM OF PRIORITY UNDER 35 U.S.C. §119

The present application for patent claims priority to Provisional Application No. 60/889,248 entitled "Methods and Apparatus For Improving Packet Cell Change Order Procedure" filed Feb. 9, 2007, and assigned to the assignee hereof and hereby expressly incorporated by reference herein.

FIELD

This disclosure relates generally to apparatus and methods for packet cell change order. More particularly, the disclosure relates to packet cell change order for wireless communication systems.

BACKGROUND

Wireless networks may have a need to transition from second generation (2G) systems such as GSM/GPRS/Edge to enhanced third generation (3G) systems such as UMTS (Universal Mobile Telecommunications System). UMTS uses a WCDMA air interface, instead of a TDMA air interface in GSM. 3G systems have both circuit switched (CS) and packet switched (PS) transport services. CS services implement a dedicated connection (circuit) between users. PS services, in contrast, provide more efficient utilization of the frequency spectrum by time sharing a pool of network resources. However, PS services are more prone to variable transport delay and possible data loss due to congestion at switching nodes.

Wireless networks are being upgraded to UMTS. Since UMTS deployments are not complete, in general, these wireless networks are dual mode, GSM and UMTS. As mobile users transit out of UMTS (3G) coverage cells, the wireless units will fall back to GSM/GPRS/Edge (2G) mode. Conventional handoff procedure is for the UMTS radio network controller (RNC), which controls base stations, to first commence compressed mode (CM) to enable user equipment (UE) to perform signal quality measurements and to report the best available GSM cells prior to cell change order (CCO). Compressed mode requires significant network resources and it is not necessary for packet switched (PS) services which are delay tolerant.

SUMMARY

Disclosed is an apparatus and method for a relatively simple cell change order (CCO) transition from one network to another network (for example, 3G to 2G) without complex implementation of mobile operations. In particular, compressed mode is not required to implement a cell change order.

According to one aspect, a method for cell change order comprises issuing a cell change order message with no compressed mode measurement to a user equipment to find a target cell in a first network, performing a power scan on the first network to find a suitable cell if the target cell is not found, and camping on the suitable cell if the suitable cell is found.

According to another aspect, a method for cell change order comprises issuing a cell change order message with no compressed mode measurement to a user equipment to find a target cell in a first network, determining if the user equipment found the target cell, determining if a dedicated resource in a second network is reserved for the user equipment if the target cell is not found, performing a power scan on the first network to find a suitable cell if there is no dedicated resource in the second network, determining if the suitable cell is found, and returning to the second network if the suitable cell is not found or camping on the suitable cell if the suitable cell is found.

According to another aspect, a method for cell change order comprises issuing a cell change order message with no compressed mode measurement to a user equipment to find a target cell in a first network, determining that the user equipment found the target cell, and camping on the target cell.

According to another aspect, a user equipment comprising a processor and a memory, the memory containing program code executable by the processor for performing the following: issuing a cell change order message with no compressed mode measurement to a user equipment to find a target cell in a first network; performing a power scan on the first network to find a suitable cell if the target cell is not found; and camping on the suitable cell if the suitable cell is found.

According to another aspect, a user equipment comprising a processor and a memory, the memory containing program code executable by the processor for performing the following: issuing a cell change order message with no compressed mode measurement to a user equipment to find a target cell in a first network; determining if the user equipment found the target cell; determining if a dedicated resource in a second network is reserved for the user equipment if the target cell is not found; performing a power scan on the first network to find a suitable cell if there is no dedicated resource in the second network; determining if the suitable cell is found; and returning to the second network if the suitable cell is not found or camping on the suitable cell if the suitable cell is found.

According to another aspect, a user equipment comprising a processor and a memory, the memory containing program code executable by the processor for performing the following: issuing a cell change order message with no compressed mode measurement to a user equipment to find a target cell in a first network; determining that the user equipment found the target cell; and camping on the target cell.

According to another aspect, a computer-readable medium including program code stored thereon, comprises program code to issue a cell change order message with no compressed mode measurement to a user equipment to find a target cell in a first network, program code to perform a power scan on the first network to find a suitable cell if the target cell is not found, and program code to camp on the suitable cell if the suitable cell is found.

According to another aspect, a computer-readable medium including program code stored thereon, comprises program code to issue a cell change order message with no compressed mode measurement to a user equipment to find a target cell in a first network, program code to determine if the user equipment found the target cell, program code to determine if a dedicated resource in a second network is reserved for the user equipment if the target cell is not found, program code to perform a power scan on the first network to find a suitable cell if there is no dedicated resource in the second network, program code to determine if the suitable cell is found, and program code to return to the second network if the suitable cell is not found or camping on the suitable cell if the suitable cell is found.

According to another aspect, a computer-readable medium including program code stored thereon, comprises program code to issue a cell change order message with no compressed mode measurement to a user equipment to find a target cell in a first network, program code to determine that the user equipment found the target cell, and program code to camp on the target cell.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

The various illustrative logical blocks, modules, and circuits described herein may be implemented or performed with one or more processors. A processor may be a general purpose processor, such as a microprocessor, a specific application processor, such a digital signal processor (DSP), or any other hardware platform capable of supporting software. Software shall be construed broadly to mean any combination of instructions, data structures, or program code, whether referred to as software, firmware, middleware, microcode, or any other terminology. Alternatively, a processor may be an application specific integrated circuit (ASIC), a programmable logic device (PLD), a field programmable gate array (FPGA), a controller, a micro-controller, a state machine, a combination of discrete hardware components, or any combination thereof The various illustrative logical blocks, modules, and circuits described herein may also include machine readable medium for storing software. The machine readable medium may also include one or more storage devices, a transmission line, or a carrier wave that encodes a data signal.

Figure 1:
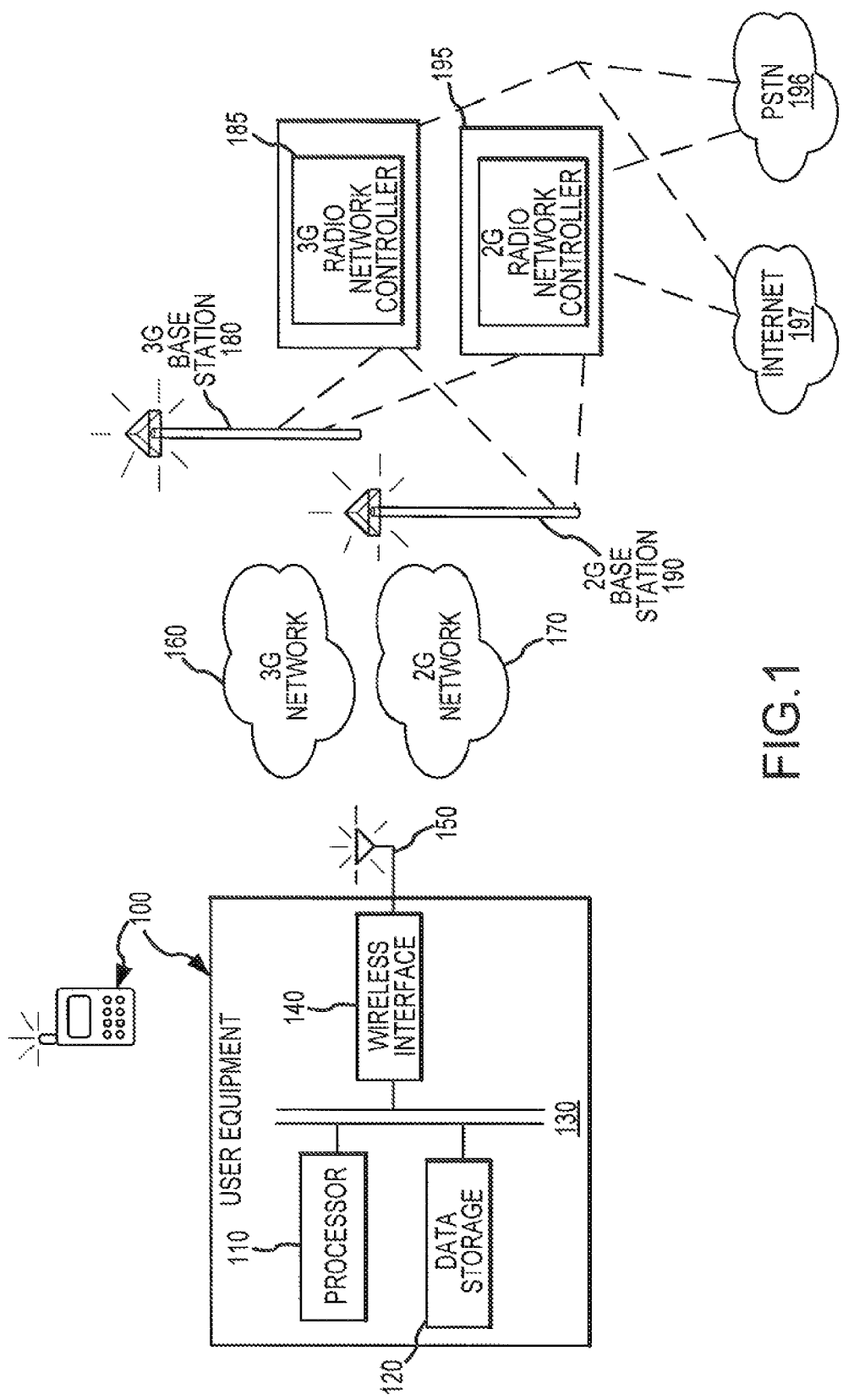
FIG. 1 illustrates an exemplary wireless network system.

FIG. 1 illustrates an exemplary wireless network system. User equipment 100 is a mobile wireless communications device. In one aspect, the user equipment 100 comprises a processor 110 for performing processing functions, a data storage 120 for storing data, an internal bus 130 for connecting internal components in the user equipment 100, a wireless modem/transceiver 140 for transmitting and receiving data via the 3G network or 2G network, and an antenna 150 for transmitting and receiving to and from the wireless networks. One skilled in the art would understand that the 3G and 2G networks can include other wireless networks without affecting the spirit or scope of the present disclosure.

As examples, shown in FIG. 1 are two wireless networks—the 3G network 160 and the 2G network 170. In one aspect, the 3G network includes one or more of a Universal Mobile Telecommunications System (UMTS), CDMA 2000 or others, etc. The 3G network 160 includes a plurality of 3G base stations 180 which serve as a 3G network interface between the user equipment 100 and terrestrial networks such as, but not limited to, the Public Switched Telephone Network (PSTN) 196, the Internet 197 or others, etc. In one aspect, the 3G network includes a 3G radio network controller 185 which is used to manage the connections between the user equipment 100 and the 3G base station 180. One skilled in the art would understand other radio network controllers with the functions described herein are included in other wireless networks.

In one aspect, the 2G network includes GSM/GPRS/Edge, cdma one (IS-95) or others, etc. The 2G network 170 includes a plurality of 2G base stations 190 which serve as a 2G network interface between the user equipment 100 and terrestrial networks such as, but not limited to, the Public Switched Telephone Network (PSTN) 196, the Internet 197 or others, etc. In one aspect, the 2G network includes a 2G radio network controller 195 which is used to manage the connections between the user equipment 100 and the 2G base station 190. One skilled in the art would understand other radio network controllers with the functions described herein are included in other wireless networks.

3G network coverage, for example UMTS coverage, is not ubiquitous and can be spotty. Thus, wireless network operators rely on 2G network as a fallback network when 3G network coverage is unavailable. To accommodate the cell change order from 3G to 2G, the user equipment 100 is compatible with both 3G networks and 2G networks in a hybrid access mode. In one example, as the user equipment 100 moves out of 3G coverage, the wireless network transitions the user equipment 100 to a 2G network for coverage. Transition from the 3G network to the 2G network requires some finite time to implement and may degrade both network capacity and call reliability and performance.

In UMTS (3G) networks, the radio network controller (RNC) initiates an operational mode known as compressed mode (CM) to enable the user equipment 100 to measure and report back the best available GSM (2G) cell to the RNC. The RNC then uses these empirical measurements to generate a cell change order (CCO) directive to transition the user equipment 100 from 3G coverage (UMTS in this example) to 2G coverage (GSM in this example). However, using compressed mode requires significant network resources to implement. Delay tolerant transport services such as those employing packet switched (PS) technique do not typically require compressed mode.

Transport services between two communicating users are distinguished by the switching technique used to route information between the two users. Circuit switching (CS) is used in telephony networks. In the CS technique, a dedicated set of network resources, such as frequency slot, time slot, CDMA code, antenna beam, etc. are reserved along the wireless path between the user equipment 100 and the base station. These dedicated network resources are generally known as "circuit." Information between the users flow in a continuous manner over one dedicated path. In this manner, the transport latency is minimized since the reserved network resources are dedicated for this user-base station path only. However, not all user applications require the dedicated allocation of network resources. For example, certain delay tolerant applications such as, but not limited to, message transfers, e-mails, file downloads, Web browsing and others etc. do not require a dedicated user-base station path.

In packet switching (PS) technique, information between users does not need to flow in a continuous manner over one dedicated path. Rather, in one aspect, the information can be first decomposed into discrete message blocks of variable size, known as packets. Additional overhead information is attached to each packet to provide, for example, a destination address. The packet switched service operates by routing each packet individually according to the destination address and the routing protocol used at each switching node in the network. Since in the packet switched services the network resources are not dedicated a priori, the information may travel along various paths. This versatility promotes efficient usage of network resources through statistical multiplexing and provides a simpler implementation of network resource allocation. However, in packet switched services, there may be the introduction of a variable transport delay between users. For communications that demand continuous message transport such as voice telephony, streaming video, etc., the transport service must be operated in a manner that the user perceives as a continuous stream. For discrete message transport such as message transfers, e-mail, file downloads, Web browsing, etc., the need for an emulation of continuous streams is not as great. These discrete message transports are often considered to be delay tolerant applications.

Figure 2:
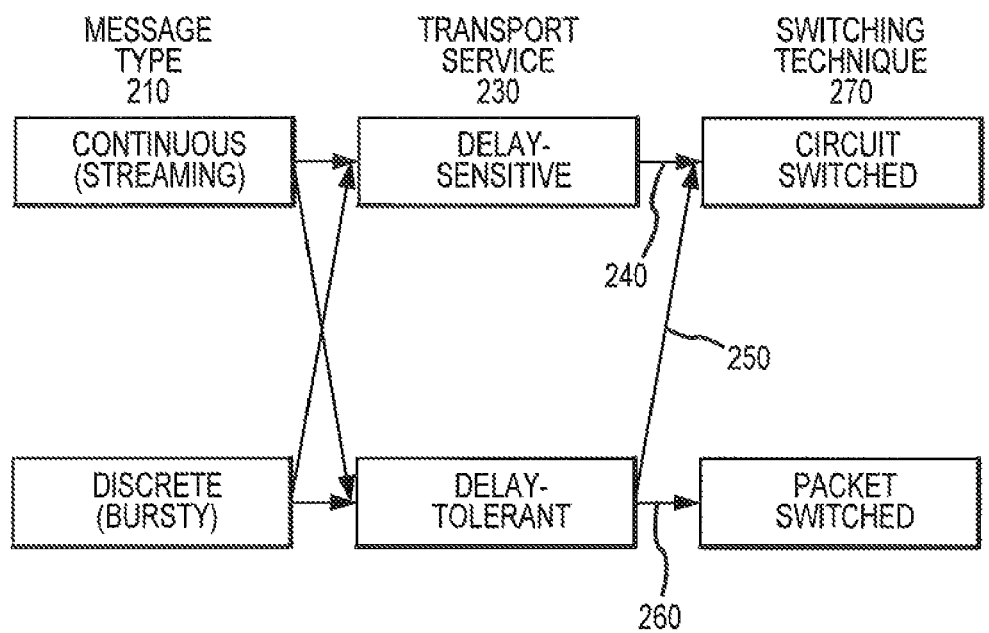
FIG. 2 illustrates an exemplary relationship among message types, transport services and switching techniques.

FIG. 2 illustrates an exemplary relationship among message types 210, transport services 230 and switching techniques 270. The message type 210 is distinguished by whether or not the information is generated continuously or in discrete segments. The transport service 230 required by the application may be either delay sensitive or delay tolerant, depending on the sensitivity of the application to transport delay (latency). The switching technique 270 may be either circuit switched or packet switched. Although both continuous (streaming) and discrete (bursty) messages may be switched by either circuit switched or packet switched techniques, delay sensitive transport services tend to use circuit switched techniques as indicated by line 240, and delay tolerant transport services will use either circuit switched techniques as indicated by line 250 or packet switched techniques as indicated by line 260 depending on application requirements.

In one wireless network scenario, a user equipment 100 is first within the coverage of a 3G network 160. As the user equipment 100 moves out of the coverage of the 3G network 160, the 3G network must transition the user equipment 100 to a 2G network 170 if no other 3G networks are available. The 3G radio network controller 185 monitors the received signal quality between the 3G base station 180 and the user equipment 100. Based on these received signal quality, the 3G radio network controller 185 may interpret a degrading received signal as due to user equipment 100 motion out of the coverage area of the 3G network. If no other 3G networks are available, the 3G radio network controller 185 may decide to transition the user equipment 100 to the 2G network 170 coverage area. The 3G radio network controller 185 issues a cell change order (CCO) to initiate the transition by the user equipment 100 to the 2G network 170. Prior to the issuance of the CCO, the compressed mode (CM) is not enabled so that the user equipment need not measure and report back other available cells in the 2G network 170 while it is still within the 3G network coverage area. By not enabling the compressed mode, the burden of the wireless network operator is greatly reduced. The simplification in the CCO does not require implementation of the compressed mode for delay tolerant services and does not require monitoring equipments to determine the target cell from the 2G network prior to issuing the CCO message.

Figure 3:
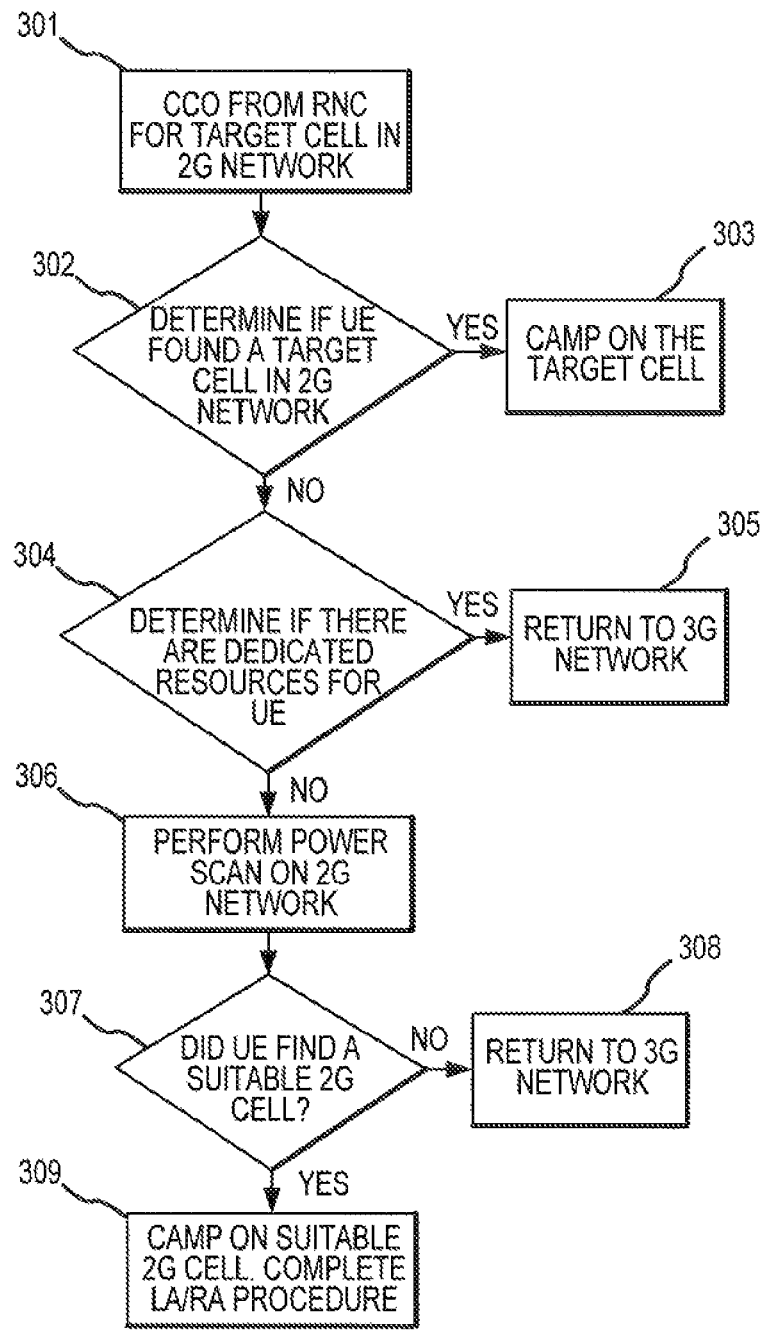
FIG. 3 illustrates an operational procedure for the cell change order (CCO).

FIG. 3 illustrates an operational procedure for the cell change order (CCO). In block 301, the 3G radio network controller 180 issues a CCO message to the user equipment 100 for a target cell in the 2G network 170. In one aspect, compressed mode (CM) is not enabled and does not influence the CCO message. Here, no compressed mode measurements are taken to influence the CCO message. In block 302, determine if the user equipment 100 found a target cell in the 2G network 170. In one aspect, the target cell is a priori selected by the 3G network 160. One skilled in the art would understand that the a priori selection of a target cell could be based on system parameters such as, but not limited to, selection by a network algorithm, a look-up table, historical records, operator inputs or others etc. without affecting the spirit or scope of the disclosure. If a target cell is found (Yes), proceed to block 303. In block 303, the user equipment 100 camps on the target cell. If the target cell is not found (No), proceed to block 304. In block 304, determine if there are any other dedicated resources in the 3G network that are reserved for the user equipment 100. In one aspect, determine if the 3G radio network controller 185 has dedicated resources for the user equipment 100. If there is at least one dedicated resources that were reserved for the user equipment 100, proceed to block 305. In block 305, the user equipment 100 returns to the 3G network 160. If there are no dedicated resources that were reserved for the user equipment 100, proceed to block 306. In block 306, the user equipment 100 performs a power scan on the 2G network 170 to determine suitable cells in the 2G network 170. In block 307, determine if a suitable cell has been found. In one aspect, the search is for a suitable cell within the Public Land Mobile Network (PLMN). If a suitable cell is not found, proceed to block 308 where the user equipment 100 returns to the 3G network 160. If a suitable cell is found, proceed to block 309 where the user equipment 100 camps on the cell in the 2G network 170 and completes the Location Area/Routing Area (LA/RA) procedure. In one aspect, the user equipment 100 comprises a processor and a memory wherein the memory contains program code executable by the processor to perform one or more of the functions recited in one or more of the blocks shown in FIG. 3.

Figure 4:
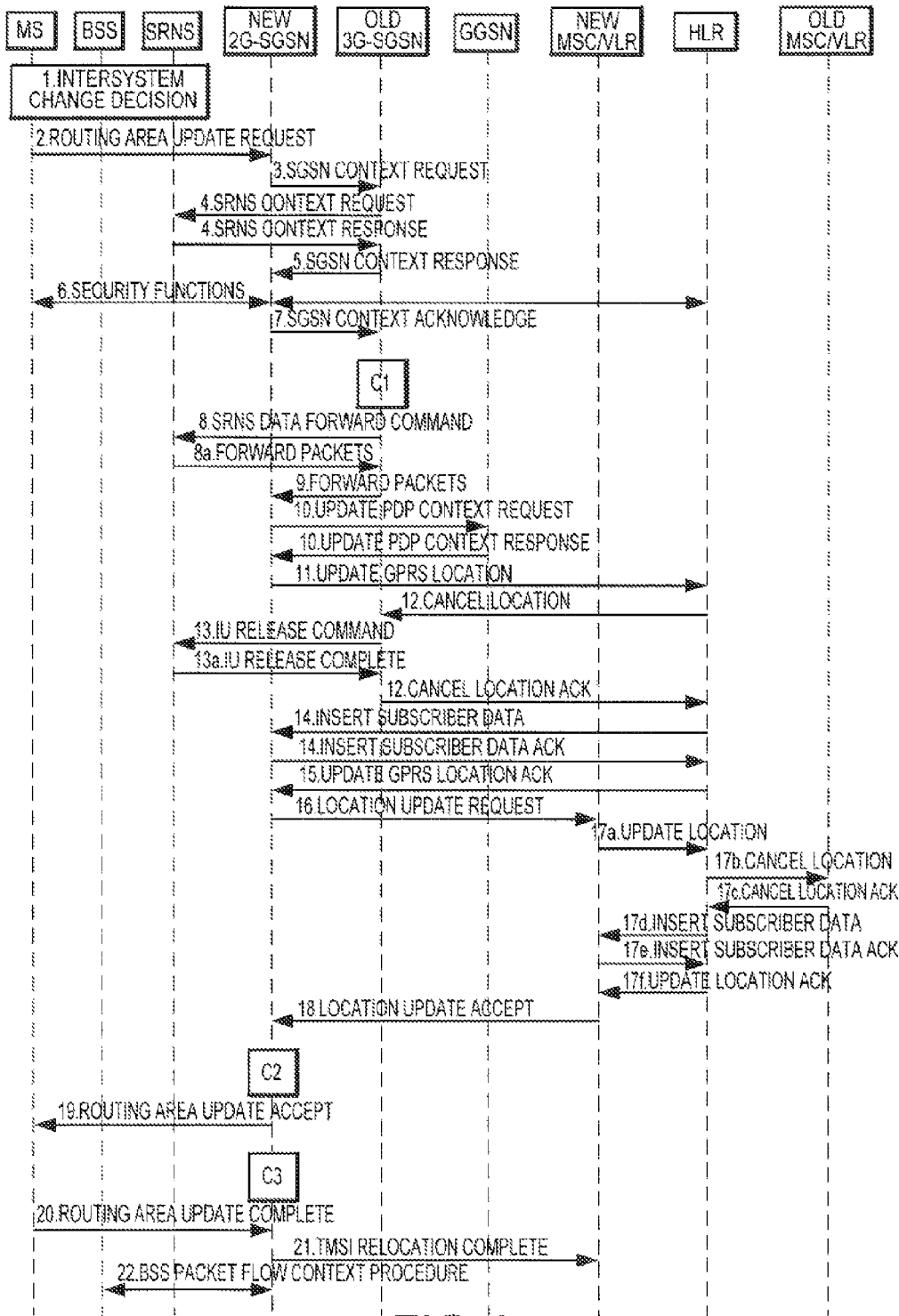
FIG. 4 illustrates an exemplary flow diagram for the transition from a 3G network to a 2G network after the initiation of a cell change order (CCO).

FIG. 4 illustrates an exemplary flow diagram for the transition from a 3G network 160 to a 2G network 170 after the initiation of a cell change order (CCO). FIG. 4 illustrates various exemplary messages sent among various exemplary wireless network entities. In FIG. 4, MS represents mobile station or user equipment 100. BSS represents the base station subsystem, SRNS represents the serving radio network subsystem. For the General Packet Radio Service (GPRS), the serving GPRS support nodes for the 3G network and 2G network are represented by 3G-SGSN and 2G-SGSN, respectively. The gateway GPRS support node is represented by GGSN. In one aspect, the SGSN interconnects the wireless access connections to the packet switched core network. In one aspect, he GGSN provides an interface between the packet switched core network and external networks, such as, but not limited to, the Internet. The mobile switching center/visitor location register is represented by MSC/VLR. The home location register is denoted by HLR.

As illustrated in FIG. 4, step 1 in the message flow is an intersystem change decision. Step 2 is a Routing Area Update Request from the MS to the new 2G-SGSN. Step 3 is a SGSN Context Request sent from the new 2G-SGSN to the old 3G-SGSN. In step 4, the old 3G-SGSN sends a SRNS Context Request to the SRNS which replies back with a SRNS Context Response. In step 5, the old 3G-SGSN sends a SGSN Context Response to the new 2G-SGSN. Security functions among the MS, 2G-SGSN and HLR are implemented in step 6. In step 7, the new 2G-SGSN sends a SGSN Context Acknowledge to the old 3G-SGSN. In step 8, the old 3G-SGSN sends a SRNS Data Forward Command to SRNS which replies back with Forward Packets. The Forward Packets are sent from the old 3G-SGSN to the new 2G-SGSN in step 9. In step 10, the Update PDP Context Request is sent from the new 2G-SGSN to the GGSN which then replies back with an Updated PDP Context Response. An Update GPRS Location message is sent by the new 2G-SGSN to the HLR in step 11. The HLR sends a Cancel Location message to the old 3G-SGSN which replies with a Cancel Location Ack (Acknowledgement) in step 12. In step 13, an Iu Release Command is sent from the old 3G-SGSN to the SRNS which replies back with an Iu Release Complete message. Iu is a standard interface in UMTS and is the interface between the radio access network (RAN) and the Core Network (CN) in UMTS. The Core Network (CD) can be either circuit switched or packet switched. The HLR sends an Insert Subscriber Data message to the new 2G-SGSN in step 14 which replies back with a Insert Subscriber Data Ack (Acknowledgement). In step 15, the HLR sends an Update GPRS Location Ack (Acknowledgement) to the new 2G-SGSN. In step 16, the new 2G-SGSN sends a Location Update Request to the new MSC/VLR. The new MSC/VLR sends an Update Location message to the HLR; the HLR sends a Cancel Location message to the old MSC/VLR; the old MSC/VLR replies back with a Cancel Location Ack (Acknowledgement) to the HLR; the HLR sends an Insert Subscriber Data to the new MSC/VLR; the new MSC/VLR replies back with a Insert Subscriber Data Ack (Acknowledgement) to the HLR; and the HLR sends back an Update Location Ack (Acknowledgement) to the new MSV/VLR, all in step 17. In step 18, the new MSC/VLR sends a Location Update Accept message to the new 2G-SGSN. In step 19, the new 2G-SGSN sends a Routing Area Update Accept message to the MS. The MS replies back with a Routing Area Update Complete message to the new 2G-SGSN in step 20. In step 21, the new 2G-SGSN sends a TMSI Reallocation Complete message to the new MSC/VLR. In the context of step 21, TMSI stands for Temporary Mobile Station Identifier. In step 22, the BSS Packet Flow Context Procedure is exchanged between the BSS and the new 2G-SGSN to complete the message flow. One skilled in the art would understand that the steps illustrated in FIG. 4 are exemplary and that other steps may be included, steps illustrated may be deleted and/or the sequence of steps may be changed without affecting the spirit and scope of the disclosure.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for performing a cell change comprising:
   operating user equipment on a second network;
   receiving at the user equipment a cell change order message from the second network requesting to find a target cell in a first network, wherein no compressed mode measurements are used to influence the cell change order message;
   performing a power scan on the first network, in response to the cell change order, to find a suitable cell if the target cell is not found; and
   camping on the suitable cell if the suitable cell is found.

2. The method of claim 1 further comprising completing a Location Area/Routing Area (LA/RA) procedure.

3. The method of claim 1 wherein the suitable cell is within a Public Land Mobile Network.

4. The method of claim 1 further comprising determining if the user equipment has not found the target cell.

5. The method of claim 4 further comprising determining if there is no dedicated resource in the second network reserved for the user equipment.

6. The method of claim 5 further comprising determining if the suitable cell is found.

7. The method of claim 6 wherein the first network is a 2G network and the second network is a 3G network.

8. The method of claim 6 wherein the first network is a GSM network and the second network is a UMTS network.

9. The method of claim 6 wherein the suitable cell is within a Public Land Mobile Network.

10. The method of claim 5 wherein the dedicated resource is dedicated by a radio network controller.

11. The method of claim 1 further comprising determining if there is no dedicated resource in the second network reserved for the user equipment.

12. The method of claim 11 wherein the dedicated resource is dedicated by a radio network controller.

13. The method of claim 1 further comprising determining if the suitable cell has been found.

14. The method of claim 13 wherein the suitable cell is within a Public Land Mobile Network.

15. The method of claim 1 wherein the first network is a 2G network.

16. The method of claim 1 wherein the first network is a GSM network.

17. A method for performing a cell change comprising:
    operating user equipment on a second network;
    receiving at the user equipment a cell change order message from the second network requesting to find a target cell in a first network, wherein no compressed mode measurements are used to influence the cell change order message;
    determining if the user equipment found the target cell;
    determining if a dedicated resource in the second network is reserved for the user equipment if the target cell is not found;
    performing a power scan on the first network, in response to the cell change order, to find a suitable cell if there is no dedicated resource in the second network;
    determining if the suitable cell is found; and
    returning to the second network if the suitable cell is not found or camping on the suitable cell if the suitable cell is found.

18. The method of claim 17 wherein the first network is a 2G network and the second network is a 3G network.

19. The method of claim 17 wherein the first network is a GSM network and the second network is a UMTS network.

20. The method of claim 17 further comprising completing a Location Area/Routing Area (LA/RA) procedure.

21. The method of claim 17 wherein the suitable cell is within a Public Land Mobile Network.

22. A method for performing a cell change comprising:
    operating user equipment on a second network;

receiving at the user equipment a cell change order message from the second network requesting to find a target cell in a first network, wherein no compressed mode measurements are used to influence the cell change order message;

determining that the user equipment found the target cell; and camping on the target cell.

23. A user equipment comprising a processor and a memory, the memory containing program code executable by the processor for performing the following:

operating the user equipment on a second network;

receiving at the user equipment a cell change order message from the second network requesting to find a target cell in a first network, wherein no compressed mode measurements are used to influence the cell change order message;

performing a power scan on the first network, in response to the cell change order, to find a suitable cell if the target cell is not found; and camping on the suitable cell if the suitable cell is found.

24. The user equipment of claim 23 wherein the memory further contains program code executable by the processor to determine if the user equipment has not found the target cell.

25. The user equipment of claim 23 wherein the memory further contains program code executable by the processor to determine if there is no dedicated resource in the second network reserved for the user equipment.

26. The user equipment of claim 25 wherein the first network is a 2G network and the second network is a 3G network.

27. The user equipment of claim 25 wherein the first network is a GSM network and the second network is a UMTS network.

28. The user equipment of claim 23 wherein the memory further contains program code executable by the processor to determine if the suitable cell has been found.

29. A user equipment comprising a processor and a memory, the memory containing program code executable by the processor for performing the following:

operating the user equipment on a second network;

receiving at the user equipment a cell change order message from the second network requesting to find a target cell in a first network, wherein no compressed mode measurements are used to influence the cell change order message;

determining if the user equipment found the target cell;

determining if a dedicated resource in the second network is reserved for the user equipment if the target cell is not found;

performing a power scan on the first network, in response to the cell change order, to find a suitable cell if there is no dedicated resource in the second network;

determining if the suitable cell is found; and returning to the second network if the suitable cell is not found or camping on the suitable cell if the suitable cell is found.

30. The user equipment of claim 29 wherein the first network is a 2G network and the second network is a 3G network.

31. The user equipment of claim 29 wherein the first network is a GSM network and the second network is a UMTS network.

32. A user equipment comprising a processor and a memory, the memory containing program code executable by the processor for performing the following:

operating the user equipment on a second network;

receiving at the user equipment a cell change order message from the second network requesting to find a target cell in a first network, wherein no compressed mode measurements are used to influence the cell change order message;

determining that the user equipment found the target cell; and camping on the target cell.

33. A non transitory computer-readable medium including program code stored thereon, the program code executable by a processor, comprising:

program code to operate user equipment on a second network;

program code to receive at the user equipment a cell change order message from the second network requesting to find a target cell in a first network, wherein no compressed mode measurements are used to influence the cell change order message;

program code to perform a power scan on the first network, in response to the cell change order, to find a suitable cell if the target cell is not found; and program code to camp on the suitable cell if the suitable cell is found.

34. The non transitory computer-readable medium of claim 33 further comprising program code to determine if the user equipment has not found the target cell.

35. The non transitory computer-readable medium of claim 33 further comprising program code to determine if there is no dedicated resource in the second network reserved for the user equipment.

36. The non transitory computer-readable medium of claim 33 further comprising program code to determine if the suitable cell has been found.

37. The non transitory computer-readable medium of claim 35 wherein the first network is a 2G network and the second network is a 3G network.

38. The non transitory computer-readable medium of claim 35 wherein the first network is a GSM network and the second network is a UMTS network.

39. A non transitory computer-readable medium including program code stored thereon, the program code executable by a processor, comprising:

program code to operate user equipment on a second network;

program code to receive at the user equipment a cell change order message from the second network requesting to find a target cell in a first network, wherein no compressed mode measurements are used to influence the cell change order message;

program code to determine if the user equipment found the target cell;

program code to determine if a dedicated resource in the second network is reserved for the user equipment if the target cell is not found;

program code to perform a power scan on the first network, in response to the cell change order, to find a suitable cell if there is no dedicated resource in the second network;

program code to determine if the suitable cell is found; and program code to return to the second network if the suitable cell is not found or camping on the suitable cell if the suitable cell is found.

40. The non transitory computer-readable medium of claim 39 wherein the first network is a 2G network and the second network is a 3G network.

41. The non transitory computer-readable medium of claim 39 wherein the first network is a GSM network and the second network is a UMTS network.

42. A non transitory computer-readable medium including program code stored thereon, the program code executable by a processor, comprising:
- program code to operate user equipment on a second network;
- program code to receive at the user equipment a cell change order message from the second network requesting to find a target cell in a network, wherein no compressed mode measurements are used to influence the cell change order message;
- program code to determine that the user equipment found the target cell; and
- program code to camp on the target cell.

43. An apparatus for performing a cell change comprising:
- means for operating user equipment on a second network;
- means for receiving at the user equipment a cell change order message from the second network requesting to find a target cell in a first network, wherein no compressed mode measurements are used to influence the cell change order message;
- means for performing a power scan on the first network, in response to the cell change order, to find a suitable cell if the target cell is not found; and
- means for camping on the suitable cell if the suitable cell is found.

* * * * *